(12) United States Patent
Takayama et al.

(10) Patent No.: US 7,835,101 B2
(45) Date of Patent: Nov. 16, 2010

(54) PLANAR PLASMON ANTENNA FOR USE IN NEAR-FIELD RECORDING

(75) Inventors: Seiichi Takayama, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 123 days.

(21) Appl. No.: 12/194,798

(22) Filed: Aug. 20, 2008

(65) Prior Publication Data

US 2010/0046331 A1 Feb. 25, 2010

(51) Int. Cl.
*G11B 5/02* (2006.01)
(52) U.S. Cl. .................... 360/59; 369/13.33; 369/13.13
(58) Field of Classification Search ............. 369/13.33, 369/13.13, 13.32, 13.17; 360/59; 385/129, 385/31, 88–94
See application file for complete search history.

(56) References Cited

U.S. PATENT DOCUMENTS

| | | | | |
|---|---|---|---|---|
| 6,714,370 B2 * | 3/2004 | McDaniel et al. | ............. | 360/59 |
| 6,771,445 B1 * | 8/2004 | Hamann et al. | ................ | 360/59 |
| 6,949,732 B2 * | 9/2005 | Kiguchi et al. | ............... | 250/216 |
| 7,106,664 B2 * | 9/2006 | Hasegawa et al. | ......... | 369/13.33 |
| 7,245,562 B2 * | 7/2007 | Ruigrok | ..................... | 369/13.14 |
| 7,280,297 B2 * | 10/2007 | Hamann et al. | ................ | 360/59 |
| 7,330,404 B2 | 2/2008 | Peng et al. | | |
| 2007/0230288 A1 * | 10/2007 | Nishida et al. | ............ | 369/13.13 |
| 2007/0230323 A1 * | 10/2007 | Nishida et al. | ............ | 369/275.4 |
| 2009/0059411 A1 * | 3/2009 | Tanaka et al. | ................... | 360/59 |
| 2009/0310446 A1 * | 12/2009 | Nakaoki et al. | ........... | 369/13.02 |
| 2010/0061199 A1 | 3/2010 | Hirara et al. | | |
| 2010/0061200 A1 * | 3/2010 | Shimazawa et al. | ....... | 369/13.33 |

FOREIGN PATENT DOCUMENTS

| | | |
|---|---|---|
| JP | A-2007-305184 | 11/2007 |
| JP | A-A-2008-152897 | 3/2008 |

OTHER PUBLICATIONS

William A. Challenger et al. "Optical Transducers for Near Field Recording", Japanese Journal of Applied Physics, 2006, vol. 45, No. 8B, pp. 6632-6642.

* cited by examiner

*Primary Examiner*—Tan X Dinh
(74) *Attorney, Agent, or Firm*—Oliff & Berridge, PLC

(57) ABSTRACT

A planar plasmon antenna is formed on a YZ plane including a Z-axis, the Z-axis being a propagation direction of excitation light for near-field light generation. The longitudinal direction of the planar plasmon antenna is oblique relative to the Y-axis, and the angle of a corner of the planar plasmon antenna in the YZ plane is an acute angle. The corner, which forms an acute angle, generates intense near-field light in response to excitation light irradiation.

14 Claims, 27 Drawing Sheets

Fig.9
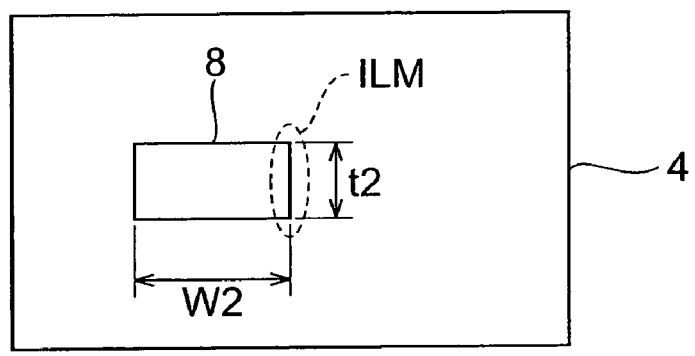
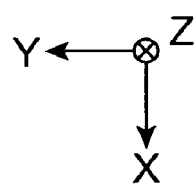

*Fig.19*

| θ [°] | θ° PEAK INTENSITY OF NEAR-FIELD LIGHT [ (V/m)² ] |
|---|---|
| 0 | 7.6 |
| 15 | 67.6 |
| 30 | 171 |
| 45 | 260 |
| 60 | 2270 |
| 72 | 973 |
| 75 | 886 |

PLANAR PLASMON ANTENNA FOR USE IN NEAR-FIELD RECORDING

BACKGROUND ART

1. Field of the Invention

The present invention relates to a planar plasmon antenna that generates high-intensity near-field light, to a thermally assisted magnetic head and to a hard disk drive.

2. Related Background Art

Thermally assisted magnetic heads for recording magnetic information by applying a magnetic field onto a magnetic recording medium, while heating the latter with near-field light, have attracted attention in recent years. U.S. Pat. No. 7,330,404 discloses such a thermally assisted magnetic head. In the thermally assisted magnetic head, a plasmon antenna comprising a small metal is disposed at a position onto which a laser beam is condensed by a lens. The plasmon antenna generates near-field light upon being irradiated by a laser beam. The longitudinal direction of the plasmon antenna is parallel to the propagation direction of the laser beam. Near-field light of sufficient intensity, however, cannot be obtained with conventional thermally assisted magnetic heads.

"Japanese Journal of Applied Physics Vol. 45, No. 8B, 2006, pp. 6632-6642" discloses a plasmon antenna, comprising a pair of triangular metal films that make up a bow-tie aperture. It is estimated that such a plasmon antenna generates near-field light of relatively high intensity. Two or more near-field light peaks are observed in plasmon antennas with such a geometry. The above prior art document describes the feature to the effect that a single triangular metal film can be used as the plasmon antenna, although in that case peak intensity is expected to be not high, unlike in the case of two triangular metal films.

SUMMARY OF THE INVENTION

An object of the present invention is to provide a plasmon antenna capable of dramatically increasing near-field light intensity beyond that of a conventional plasmon antenna, and to provide a thermally assisted magnetic head and a hard disk drive using the plasmon antenna. The plasmon antenna of the present invention is one only planar plasmon antenna that is formed, without physical separation, on a plane including a Y-axis and a Z-axis perpendicular to each other, the Z-axis being a propagation direction of excitation light for near-field light generation, wherein a longitudinal direction of the planar plasmon antenna is oblique relative to the Y-axis, and an angle $\alpha$ of a corner, in the plane, is an acute angle. The corner of such a plasmon antenna generates near-field light of remarkably higher intensity than in a conventional case.

BRIEF DESCRIPTION OF THE DRAWINGS

FIG. 9 is a front-view diagram of the vicinity of a plasmon antenna, viewed from an ABS plane.
FIG. 19 is a table setting forth the relationship between $\theta$ (°) and IL $(V/m)^2$.

DESCRIPTION OF THE PREFERRED EMBODIMENTS

Figure 1:
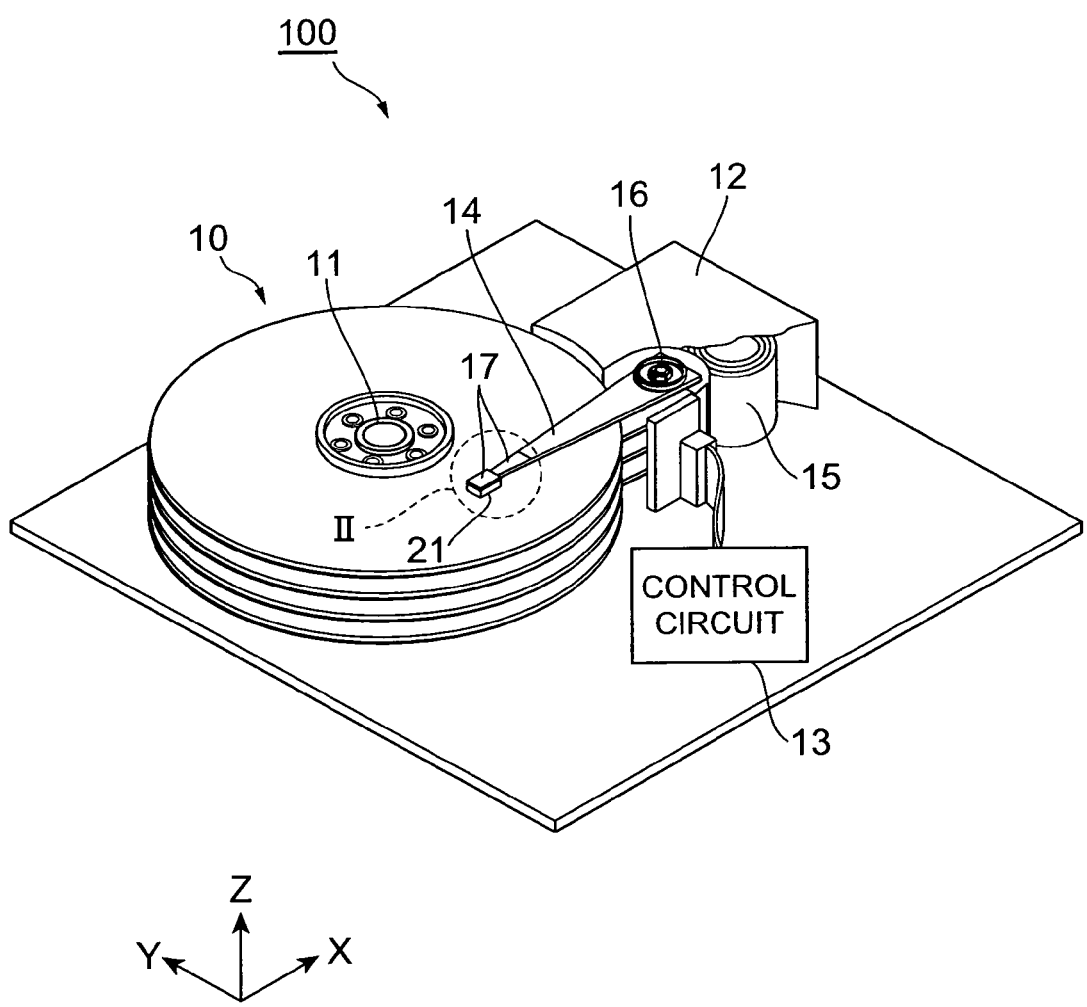
FIG. 1 is a perspective-view diagram of a hard disk drive.

Embodiments of the planar plasmon antenna, the thermally assisted magnetic head and the hard disk drive are explained next. In the drawings, identical elements are denoted with identical reference numerals, and recurrent explanations thereof are omitted.

FIG. 1 is a perspective-view diagram of a hard disk drive comprising the thermally assisted magnetic head according to the present embodiment. The XYZ orthogonal coordinate system is set as in the figure.

A hard disk drive 100 comprises magnetic disks 10, as a plurality of magnetic recording media that rotate around a rotation shaft of a spindle motor 11; an assembly carriage device 12 for positioning a thermally assisted magnetic head 21 on a track; and a recording, reproduction, and emission control circuit (control circuit) 13 for controlling writing and reading operations of the thermally assisted magnetic head 21, and for controlling a semiconductor laser element (laser diode), as a light source for emitting a laser beam (excitation light), for thermally assisted magnetic recording.

The assembly carriage device 12 is provided with a plurality of drive arms 14. These drive arms 14 are rockable around a pivot bearing shaft 16 by a voice coil motor (VCM) 15, and are stacked in the direction along this shaft 16. A head gimbal assembly (HGA) 17 is attached to the leading end of each drive arm 14. Therefore, the HGAs 17 are rockable, relative to the magnetic disks 10, around the pivot bearing shaft 16. Each HGA 17 is provided with a thermally assisted magnetic head 21 in such a manner that the latter faces the surface of each magnetic disk 10. The surface of the magnetic head 21 facing the surface of the magnetic disk 10 is a medium-facing surface S (also called an air bearing surface (ABS), see FIG. 2) of the thermally assisted magnetic head 21. The magnetic disks 10, drive arms 14, HGAs 17, and thermally assisted magnetic heads 21 may each be provided singly.

The hard disk drive 100 comprises thus HGAs 17 having thermally assisted magnetic heads 21 mounted thereon, and magnetic recording media facing the thermally assisted magnetic heads 21. In the hard disk drive 100, the thermally assisted magnetic heads 21 can generate high-intensity near-field light locally, whereby magnetic recording density can be increased dramatically.

Figure 2:
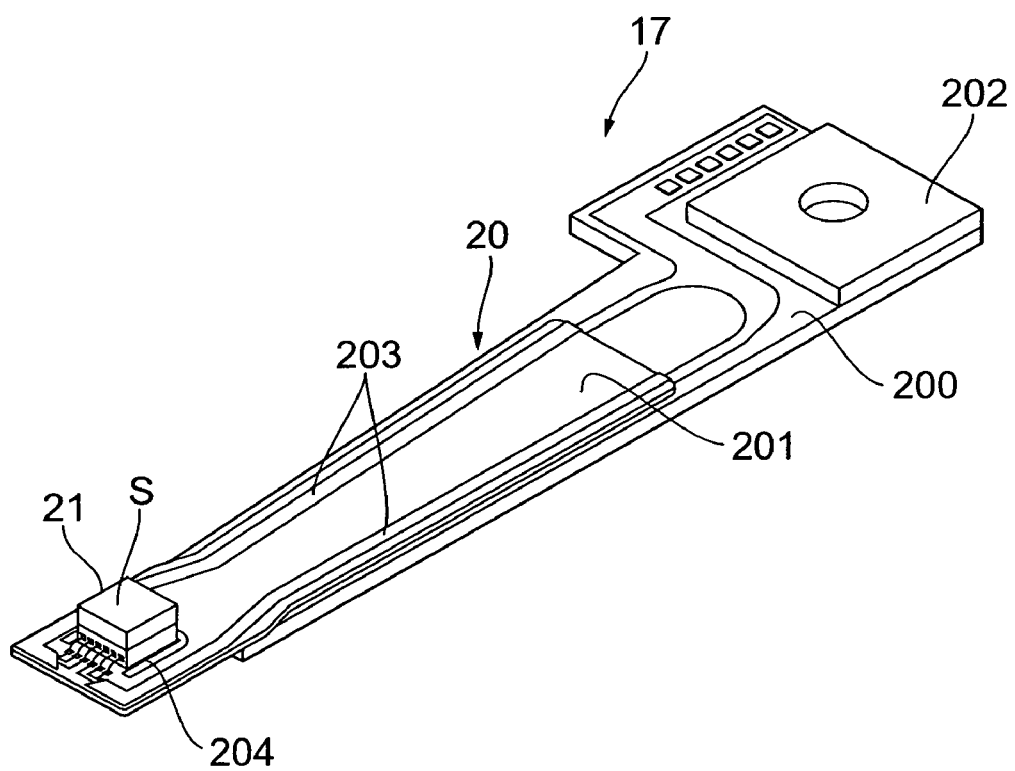
FIG. 2 is a perspective-view diagram of an HGA.

FIG. 2 is a perspective-view diagram of an HGA 17. In the figure, the medium-facing surface S of the HGA 17 is facing upwards.

The HGA 17 is constructed by fixing the thermally assisted magnetic head 21 to a leading end of a suspension 20 and by electrically connecting one end of a wiring member 203 to terminal electrodes of the thermally assisted magnetic head 21. The suspension 20 comprises mainly of a load beam 200, an elastic flexure 201 fixed and supported on the load beam 200, a tongue portion 204 formed in a plate spring shape at the tip of the flexure, a base plate 202 provided on the base of the load beam 200, and a wiring member 203 provided on the flexure 201 and comprising a lead conductor and connection pads electrically connected to the both ends of the lead conductor.

It is obvious that the structure of the suspension in the HGA 17 of the present invention is not limited to the above-described structure. Although not shown in the figure, an IC chip for head driving may be mounted midway in the suspension 20.

Figure 3:
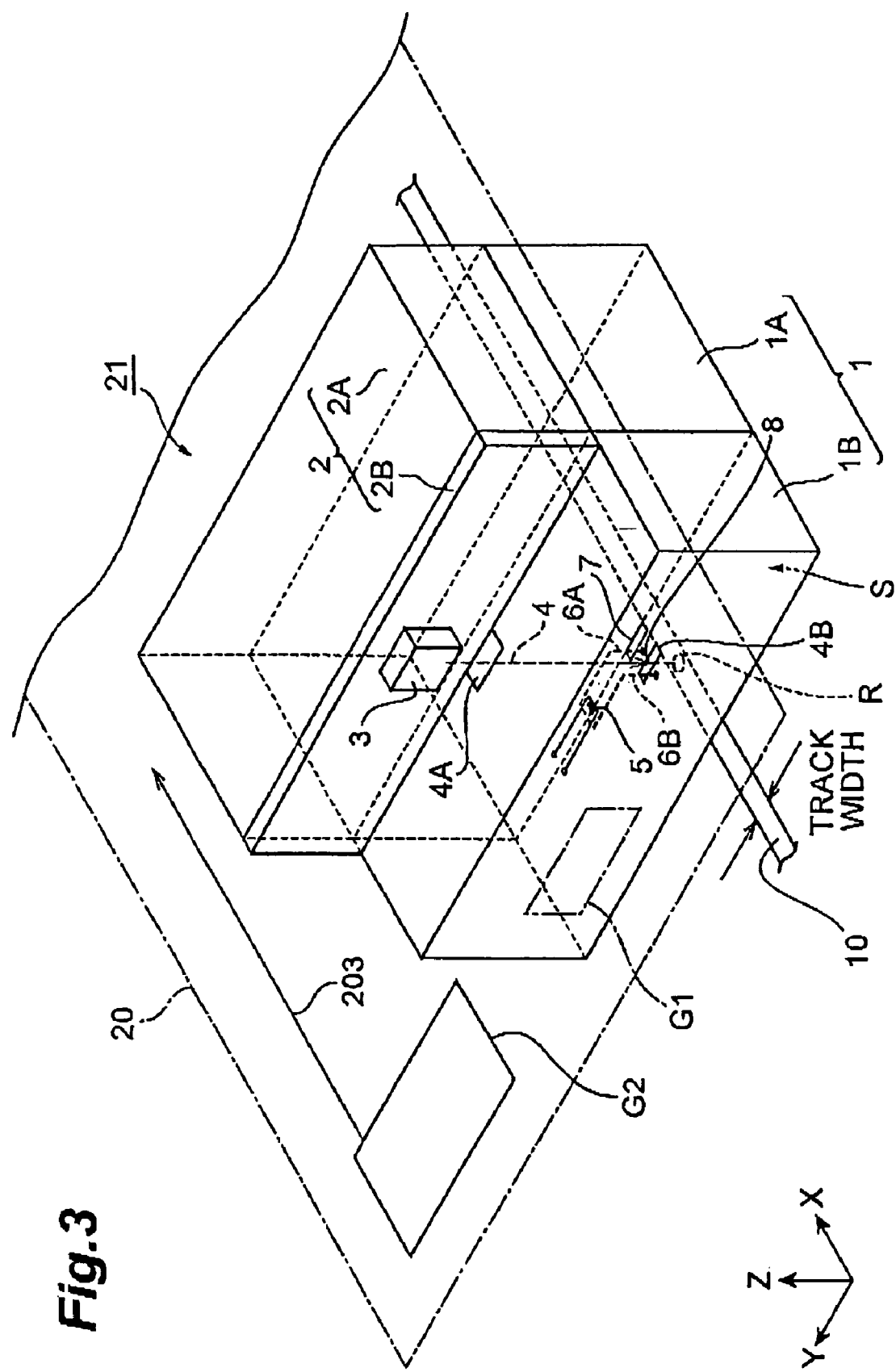
FIG. 3 is an enlarged perspective-view diagram of the vicinity of a thermally assisted magnetic head 21 illustrated in FIG. 1.

FIG. 3 is an enlarged perspective-view diagram of the vicinity of the thermally assisted magnetic head 21 illustrated in FIG. 1.

The thermally assisted magnetic head 21 is mounted on the leading end of the suspension 20. The thermally assisted magnetic head 21 comprises a slider 1 and a light source unit 2 bonded together. The slider 1 comprises a magnetic head portion 1B formed on the YZ plane of a slider substrate 1A. The XY plane of the magnetic head portion 1B, in the −Z direction, constitutes the medium-facing surface S. The light source unit 2 comprises an insulating layer 2B on the YZ plane of a light source support substrate 2A. A semiconductor laser element 3 is fixed to the insulating layer 2B, on the YZ plane.

The magnetic head portion 1B comprises a plurality of elements embedded in an insulator. Each of these elements comprises a coil 5 for generating a magnetic field through current supply; a main magnetic pole 6A extending from the center of the coil, for guiding the magnetic flux generated by the coil 5 up to the medium-facing surface S; and a auxiliary magnetic pole 6B for returning magnetic flux from the main magnetic pole 6A to the center of the coil 5. In addition, the elements comprise a magnetoresistive element (MR element) 7 having a magnetoresponsive surface exposed at the medium-facing surface S; and a core 4 of a waveguide extending in the Z-axis direction. The member around the core 4 is a cladding, comprising an insulator, that makes up the greater part of the magnetic head portion 1B. The core 4 may have various shapes. Accordingly, although herein the core 4 is depicted by a dotted line that joins a light incidence surface 4A and a light exit surface 4B, the core 4 may also be shaped, for instance, as a straight line.

The main magnetic pole 6A is exposed at the medium-facing surface S. However, the main magnetic pole 6A need not be exposed at the medium-facing surface S, provided that the main magnetic pole 6A is positioned in such a manner so as to be capable of applying a magnetic field towards a recording region R on the surface of the magnetic disk 10. The auxiliary magnetic pole 6B is provided in the vicinity of the main magnetic pole 6A. The magnetic field lines from the main magnetic pole 6A flow into the auxiliary magnetic pole 6B via the recording region R. The positional relationship between the main magnetic pole 6A and the auxiliary magnetic pole 6B can be embodied in a number of conceivable ways. Herein, the main magnetic pole 6A and the auxiliary magnetic pole 6B are disposed in such a manner that the light exit surface 4B is positioned therebetween. The leading end of a planar plasmon antenna (near-field light-emitting element) 8 is exposed at the light exit surface 4B. In the figure, plasmon antenna 8 is indicated by the arrow positioned at the tip of the core 4.

The above-described core 4 comprises the light incidence surface 4A, onto which a beam from the semiconductor laser element 3 is incident, on the XY plane, in the positive direction of the Z-axis; and the light exit surface 4B on the XY plane, in the negative direction of the Z-axis, i.e. on the medium-facing surface S. In the present embodiment, the semiconductor laser element 3 is an edge-emitting laser diode. A laser beam emitted through the end face, which is parallel to the XY plane, enters into the core 4 via the light incidence surface 4A, and strikes the plasmon antenna 8 that extends from the light exit surface 4B towards the interior of the core.

The plasmon antenna 8 resonates with the incident beam and generates near-field light that heats the recording region R. Information is written onto the recording region R when the magnetic field lines from the main magnetic pole 6A enter the heated recording region R.

Figure 5:
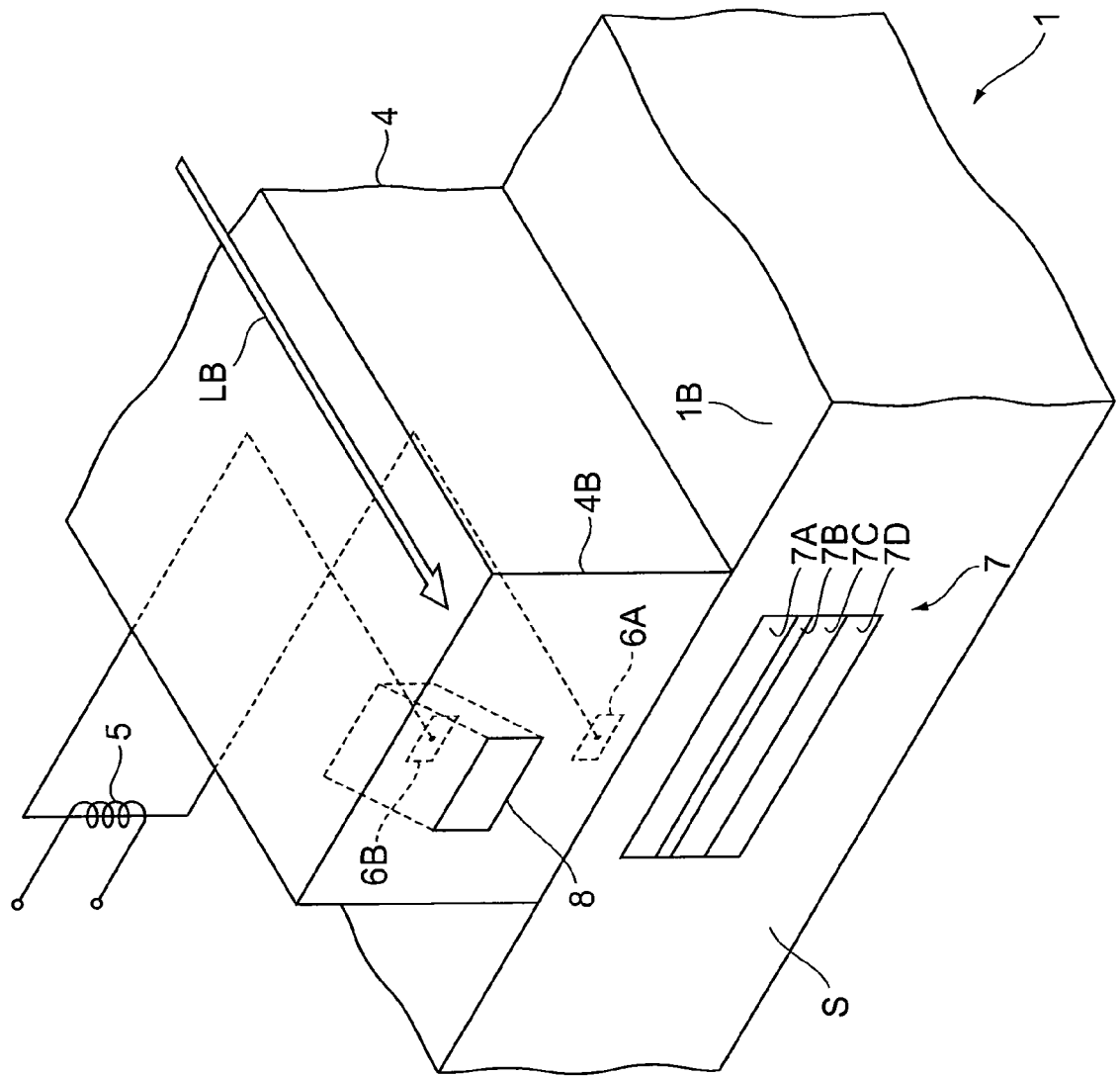
FIG. 5 is a perspective-view diagram of a characterizing portion of a thermally assisted magnetic head.

An electrode pad group G1, comprising a plurality of electrode pads, is formed on the YZ plane, in the negative direction of the X-axis, on the magnetic head portion 1B. The electrode pads are each connected to both ends of the coil 5 and to upper and lower electrodes of the MR element 7. As illustrated in FIG. 5, the MR element 7 comprises a laminate of an antiferromagnetic layer 7D, a ferromagnetic layer 7C having the magnetization direction thereof fixed by an antiferromagnetic layer 7D, and a free layer 7A where the magnetization direction is deflected in response to the surrounding magnetic field. An interlayer 7B, comprising a non-magnetic layer or a tunnel barrier layer comprising an insulator, is interposed between the free layer 7A and the ferromagnetic layer 7C. Magnetoresistance varies in the MR element 7 in response to differences in the magnetization direction of the free layer 7A and the ferromagnetic layer 7C. A hard magnet, not shown, is disposed at both ends, in the Y-axis direction, of the free layer 7A. The structure of the MR element is not necessarily limited to the above-described one. Also, the operating characteristics of the MR element do not vary depending on the material thereof.

The electrode pads in the electrode pad group G1, which are connected to the two ends of the coil 5 and the upper and lower electrodes of the MR element 7, are electrically connected to that second electrode pad group G2 formed on the suspension 20, and to the exterior, via the wiring member 203. The second electrode pad group G2 connected to the wiring member 203 comprises also a pair of electrode pads for supplying driving current to the semiconductor laser element 3. The semiconductor laser element 3 emits light when driving current is caused to flow between these electrode pads.

The slider substrate 1A and the light source support substrate 2A comprise, for instance, alutic ($Al_2O_3$—TiC). When substrates having high thermal conductivity are used as the substrates 1A and 2A, the latter have a heat-dissipating function. The XY plane on the light source support substrate 2A is bonded to the rear face of the suspension 20, in the positive direction of the Z-axis.

The magnetic head portion 1B is formed by laminating the MR element 7, the cladding, the core 4, the coil 5 and the main magnetic pole 6A along the X-axis. The laminating direction runs along the array direction of the recording region R within a track, the track width being parallel to the Y-axis.

As described above, the main magnetic pole 6A, as a magnetic recording element, is embedded in the light exit surface 4B of the optical waveguide (core). However, the main magnetic pole 6A may also be provided adjacent to the light exit surface 4B. The main magnetic pole 6A and the plasmon antenna 8 in the light exit surface 4B are disposed sufficiently close to each other so as to allow writing by the main magnetic pole 6A before the recording region R, having been heated by the plasmon antenna 8, cools down to its original temperature.

Figure 4:
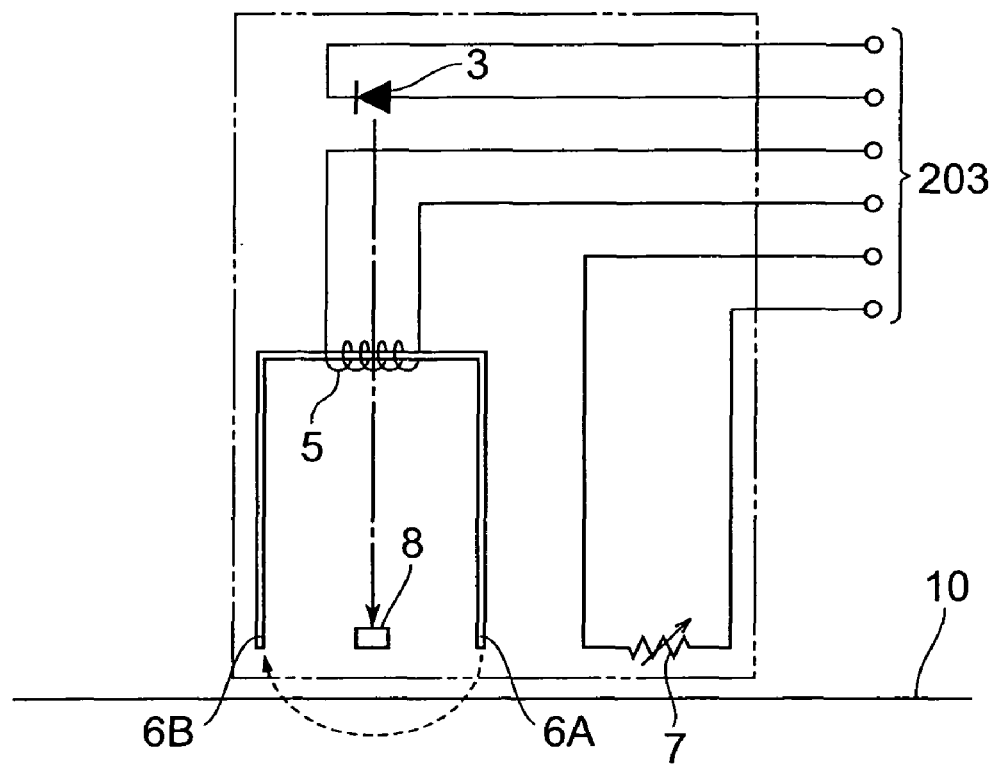
FIG. 4 is a circuit diagram of a thermally assisted magnetic head.

FIG. 4 is a circuit diagram of a thermally assisted magnetic head.

The magnetoresistance of the MR element 7 varies in response to the magnetic field generated around the recording region R of the magnetic disk 10 (see FIG. 3), whereupon there varies also the current flowing through the wiring member 203 connected to the MR element 7. The information written in the recording region R can be read by detecting thus a current.

To write information, current is made to flow between the ends of the coil 5, from another wiring member 203. Thereupon, magnetic flux, as represented by a broken line in the figure, passes from the main magnetic pole 6A to the auxiliary magnetic pole 6B, and in doing so applies a writing magnetic field to the surface region of the magnetic disk 10 between the main magnetic pole 6A and the auxiliary magnetic pole 6B. These magnetic recording elements are preferably perpendicular magnetic recording elements. The wiring member 203 supplies driving current to the semiconductor laser element 3, whereupon the latter emits a laser beam in synchrony with driving current supply.

The plasmon antenna 8 is disposed in the vicinity of the main magnetic pole 6A. As a result, the plasmon antenna 8 generates near-field light when irradiated by a laser beam from the semiconductor laser element 3. The magnetic recording region of the magnetic disk 10 is heated by the near-field light generated by the plasmon antenna 8 upon being irradiated by a laser beam, and receives the magnetic field from the main magnetic pole 6A, such that information is recorded on the basis of resulting changes in the magnetization of the magnetic recording region.

The structure of the planar plasmon antenna 8 is explained next.

FIG. 5 is a perspective-view diagram of a characterizing portion of a thermally assisted magnetic head.

The leading end of the plasmon antenna 8 is exposed at the medium-facing surface S. A laser beam LB from the semiconductor laser element propagates in the −Z direction through the core 4 of the optical waveguide and strikes the plasmon antenna 8. A description of the cladding provided around the core 4 in FIG. 5 will be omitted. The plasmon antenna 8 extends from the light exit surface 4B of the core 4 towards the interior of the core 4. The X-axis direction is herein the thickness direction of the core 4. In such a structure, the core 4 is manufactured by forming a planar plasmon antenna 8, by patterning, on the YZ plane, which is an exposed surface of a lower core, and by depositing an upper core on the lower core in such a way so as to cover the plasmon antenna 8.

The main magnetic pole 6A and the auxiliary magnetic pole 6B, disposed inside the core 4, extend up to the coil 5. The coil 5 is actually shaped as a flat spiral. The MR element 7 is disposed on an extension line along the thickness direction of the plasmon antenna 8, so that reading and writing can both be carried out on a same track.

Figure 6A:
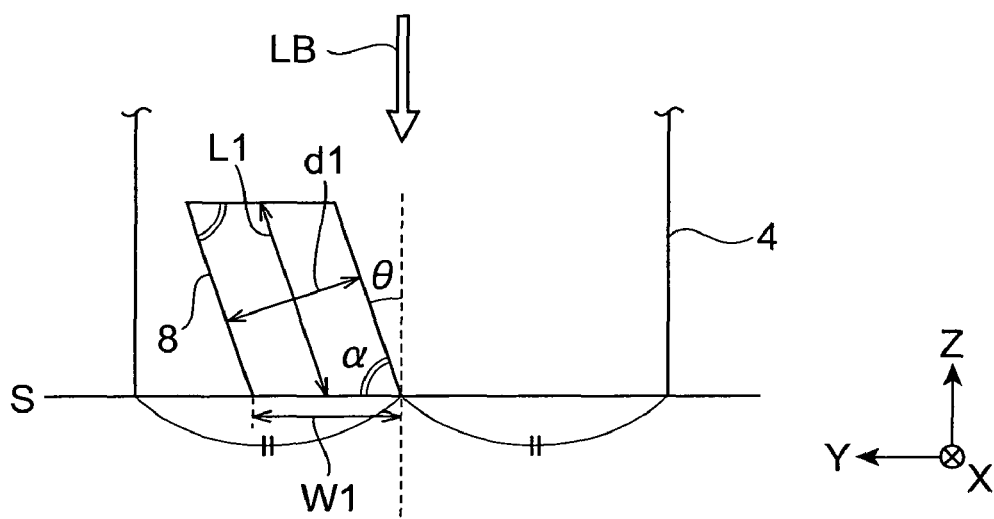
FIG. 6A is a plan-view diagram of the vicinity of a plasmon antenna.

FIG. 6A is a plan-view diagram of the vicinity of a plasmon antenna 8 having a parallelogram shape in plan view.

In the figure, the plasmon antenna 8 is viewed from the X-axis direction. The plan-view shape of the planar plasmon antenna 8 is a quadrangle, specifically a parallelogram. W1 denotes the width of the leading end of the plasmon antenna 8 along the Y-axis direction, and L1 denotes the length of the plasmon antenna 8 in the longitudinal direction. The two sides adjacent to the width W1 are parallel, the distance therebetween being d1. The longitudinal direction of the plasmon antenna 8 (defined by the length L1) is oblique relative to the propagation direction of the laser beam LB (−Z direction), with θ being the inclination angle.

The TE mode of the laser beam LB runs along the Y-axis direction. The angle α denotes the angle, within the YZ plane, formed by a corner of the plasmon antenna 8 and the medium-facing surface S, at a position in the vicinity of the center of the core 4, the angle α satisfying the relationship $\theta+\alpha=90°$. Upon irradiation of the laser beam LB, there is generated near-field light issuing from the corner forming the angle α, at the medium-facing surface S. The corner forming the angle α is positioned at the center of the width direction of the core 4. When the core 4 comprises a planar lens, the propagation direction of the chief ray of the laser beam LB coincides with the optical axis of the lens.

Figure 6B:
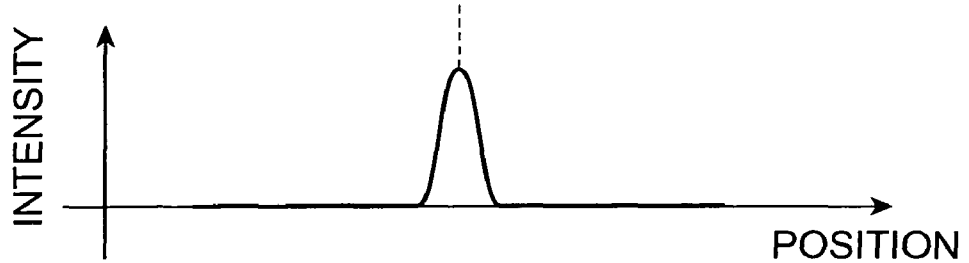
FIG. 6B is a graph illustrating the relationship between position and intensity.

FIG. 6B is a graph illustrating the relationship between the position of the plasmon antenna 8 in the Y-axis direction and near-field light intensity.

The intensity of near-field light of the plasmon antenna 8 is extremely high at the corner forming the angle α. The angle of the corner on the medium-facing surface S adjacent to the corner forming the angle α is an obtuse angle. No near-field light is generated at that corner. Therefore, the plasmon antenna 8 allows localizing the near-field light generation position within the YZ plane, and allows carrying out high-intensity and precise heating of the magnetic recording medium.

Figure 7:
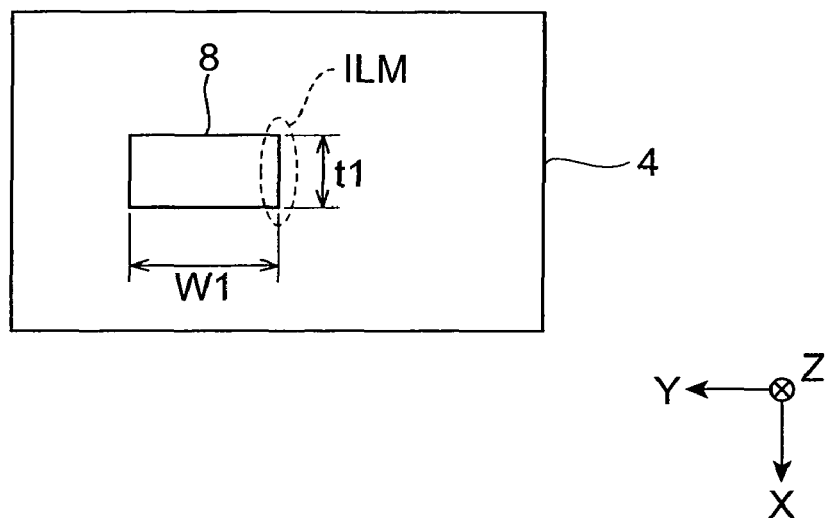
FIG. 7 is a front-view diagram of the vicinity of a plasmon antenna, viewed from an ABS plane.

FIG. 7 is a front-view diagram of the plasmon antenna 8 illustrated in FIG. 6A, as viewed from the medium-facing surface S.

The shape of the plasmon antenna 8 on the medium-facing surface is quadrangular, being depicted in the figure as rectangular. The shape of the plasmon antenna 8 comprises a width W1 in the Y-axis direction and a thickness t1 in the X-axis direction. As described above, a near-field light generation region ILM is observed, extending along the X-axis direction, at the corner forming the angle α.

An example of the dimensions of W1, L1, d1, t1, θ and α may be for instance the combination below. W1=48 nm, L1=350 nm, d1=42 nm, t1=48 nm, θ=30°, α=60°.

Figure 8A:
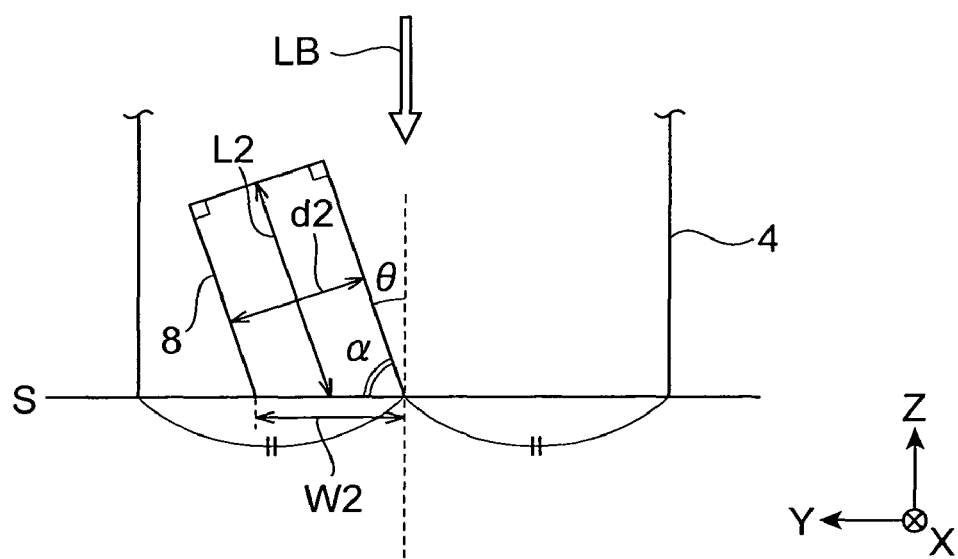
FIG. 8A is a plan-view diagram of the vicinity of a plasmon antenna.

FIG. 8A is a plan-view diagram of the vicinity of a plasmon antenna 8 having a trapezoidal shape in plan view.

In the figure, the plasmon antenna 8 is viewed from the X-axis direction. The plan-view shape of the planar plasmon antenna 8 is a quadrangle, specifically a trapezoid. W2 denotes the width of the leading end of the plasmon antenna 8 along the Y-axis direction, and L2 denotes the length of the plasmon antenna 8 in the longitudinal direction thereof. The two sides adjacent to the width W2 are parallel, the distance therebetween being d2. The longitudinal direction of the plasmon antenna 8 (defined by the length L2) is oblique relative to the propagation direction of the laser beam LB (−Z direction), with θ being the inclination angle. The length L2 is the segment that joins the center of the plasmon antenna 8 on the medium-facing surface S, within the YZ plane, with the center of the opposite side. The TE mode of the laser beam LB runs along the Y-axis direction, as is the case above.

The angle α denotes the angle, within the YZ plane, formed by the plasmon antenna 8 and the medium-facing surface S at a position in the vicinity of the center of the core 4, the angle α satisfying the relationship θ+α=90°. Upon irradiation of the laser beam LB, there is generated near-field light issuing from the corner forming the angle α with the medium-facing surface S. The corner forming the angle α is positioned at the center of the width direction of the core 4.

Figure 8B:
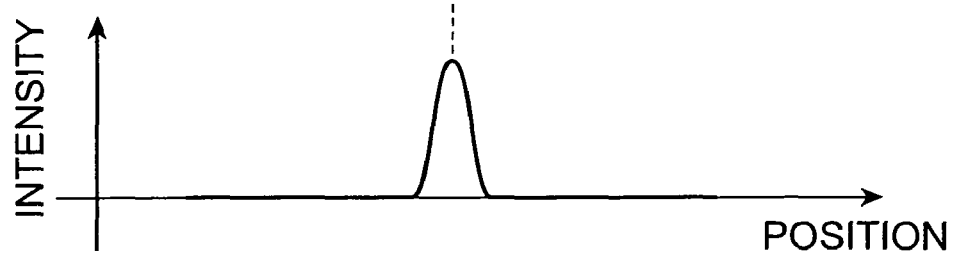
FIG. 8B is a graph illustrating a relationship between position and intensity.

FIG. 8B is a graph illustrating the relationship between the position of the plasmon antenna 8 in the Y-axis direction and near-field light intensity.

The intensity of near-field light of the plasmon antenna 8 is extremely high at the corner forming the angle α. The angle of the corner on the medium-facing surface S adjacent to the corner forming the angle α is an obtuse angle. No near-field light is generated at that corner. Therefore, the plasmon antenna 8 allows localizing the near-field light generation position within the YZ plane, and allows carrying out high-intensity and precise heating of the magnetic recording medium.

FIG. 9 is a front-view diagram of the plasmon antenna 8 illustrated in FIG. 8A, as viewed from the medium-facing surface S.

The shape of the plasmon antenna 8 on the medium-facing surface is quadrangular, being depicted in FIG. 9 as rectangular. The shape of the plasmon antenna 8 comprises a width W2 in the Y-axis direction and a thickness t2 in the X-axis direction. As described above, a near-field light generation region ILM is observed, extending along the X-axis direction, at the corner forming the angle α.

An example of the dimensions of W2, L2, d2, t2, θ and α may be for instance the combination below. W2=48 nm, L2=350 nm, d2=42 nm, t2=48 nm, θ=30°, α=60°.

The above-described inclination angle θ can be modified.

Figure 10A:
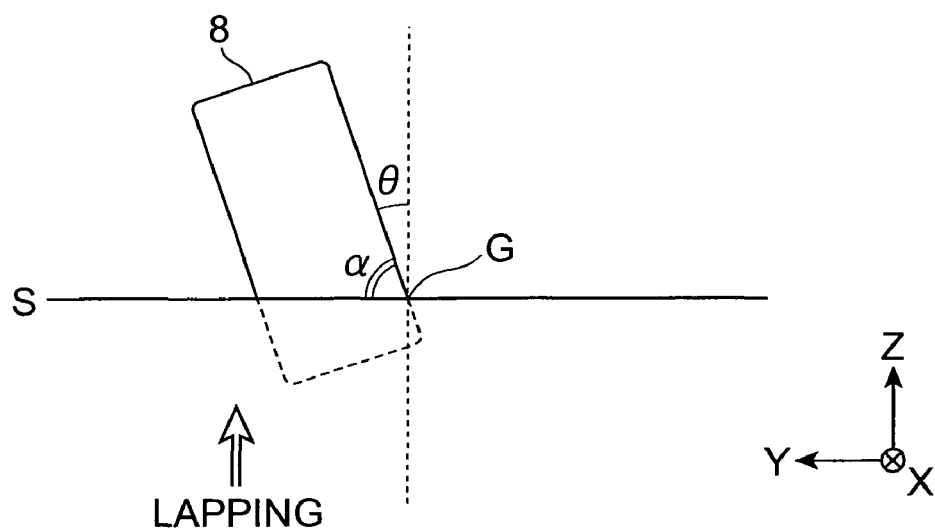
FIG. 10A is a plan-view diagram of a plasmon antenna having a small inclination angle $\theta$.

FIG. 10A is a plan-view diagram of a plasmon antenna 8 having a small inclination angle θ.

Originally, the shape of the plasmon antenna 8 in the YZ plane is elongated. For a small inclination angle θ of the plasmon antenna 8, the plasmon antenna 8 is lapped (polished) towards the Z-axis direction, whereby the shape of the plasmon antenna 8 within the YZ plane becomes that of a trapezoid. Moreover, although the four corners of the original plasmon antenna ends up slightly rounded during manufacture by patterning, the corner G with the angle α becomes sharpened by the above lapping.

Figure 10B:
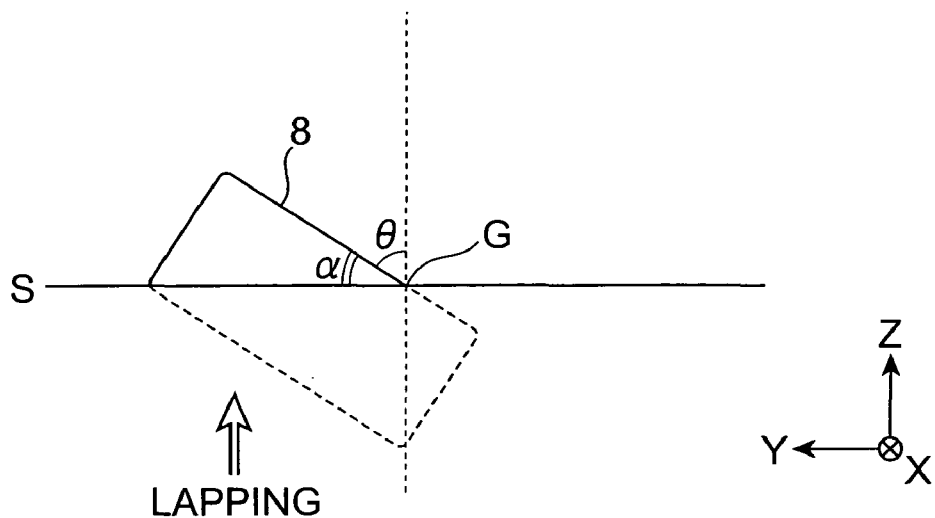
FIG. 10B is a plan-view diagram of a plasmon antenna having a large inclination angle $\theta$.

FIG. 10B is a plan-view diagram of a plasmon antenna 8 having a large inclination angle θ.

Originally, the shape of the plasmon antenna 8 in the YZ plane is elongated. For a large inclination angle θ of the plasmon antenna 8, the plasmon antenna 8 is lapped (polished) towards the Z-axis direction, whereby the shape of the plasmon antenna 8 within the YZ plane becomes easily that of a triangle. In this case as well, the corner G forming the angle α becomes sharpened by the above lapping. In the case of a right triangle, the direction from the acute-angle corner G to the right-angle corner becomes the longitudinal direction of the plasmon antenna 8.

The angle dependence of the near-field light intensity is explained next. An explanation follows next on near-field light intensity IL in the plasmon antenna 8 having a parallelogram shape, illustrated in FIG. 6A, when the inclination angle θ changes. The surface area of the plasmon antenna 8 in the YZ plane was set so as not vary with changes in the inclination angle θ. The origin position denotes the position center of the plasmon antenna 8 on the medium-facing surface S. The position in the below graphs (FIGS. 11 to 17) denotes the position on the medium-facing surface along the Y-axis. The near-field light intensity IL denotes the intensity at the end of the plasmon antenna 8, on the medium-facing surface, in the X-axis negative direction. FIGS. 11 to 17 depict the intensity on the measurement lines ML illustrated in FIGS. 20 to 26. The intensities were computed by 3D-FDTD (Three Dimensional Finite Differential Time Domain), with the mesh size set to 2 nm for calculations. Unlike above, L1 was herein 150 nm. The refractive index around the magnetic head was 1, the excitation light was a plane wave of uniform intensity and 780 nm wavelength. The horizontal axis in FIGS. 11 to 17 denotes relative position from the origin. The origin position corresponds to the center of the plasmon antenna in the Y-axis when θ=0°.

Figure 11:
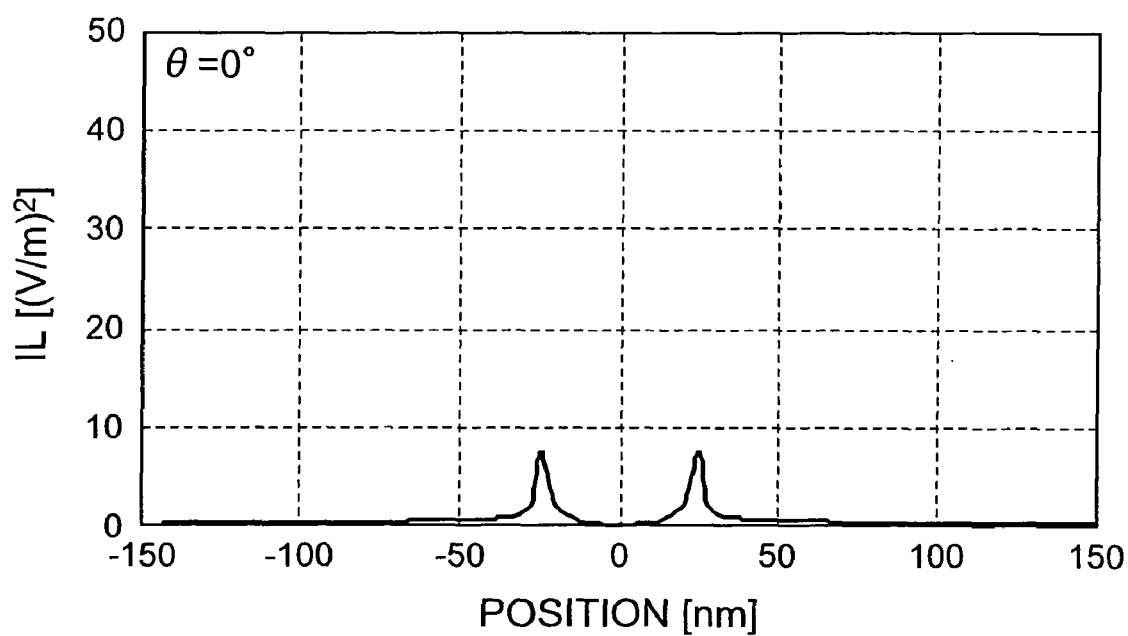
FIG. 11 is a graph illustrating the relationship between position (nm) and IL $(V/m)^2$ when $\theta=0°$.

FIG. 11 is a graph illustrating the relationship between position (nm) and IL $(V/m)^2$ when θ=0° (α=90°). The intensity (density) of the near-field light IL is low, and peaks are observed for two adjacent corners.

Figure 12:
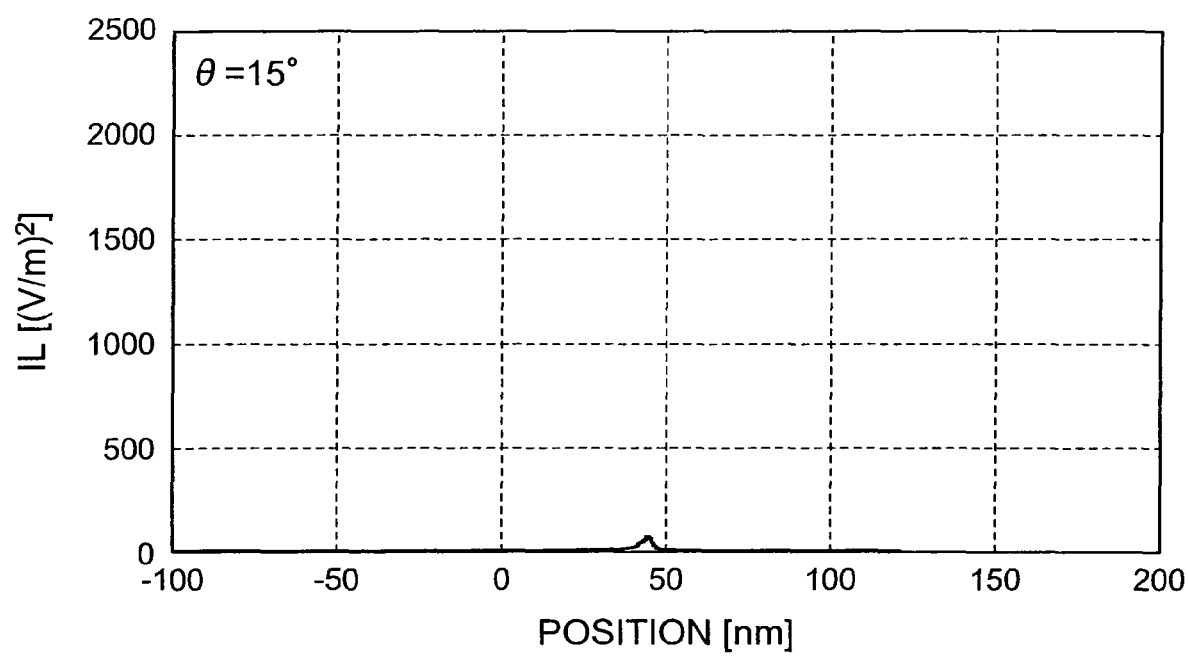
FIG. 12 is a graph illustrating the relationship between position (nm) and IL $(V/m)^2$ when $\theta=15°$.

FIG. 12 is a graph illustrating the relationship between position (nm) and IL $(V/m)^2$ when θ=15° (α=75°). The intensity (density) of the near-field light IL is higher here, and a peak is observed for a single corner.

Figure 13:
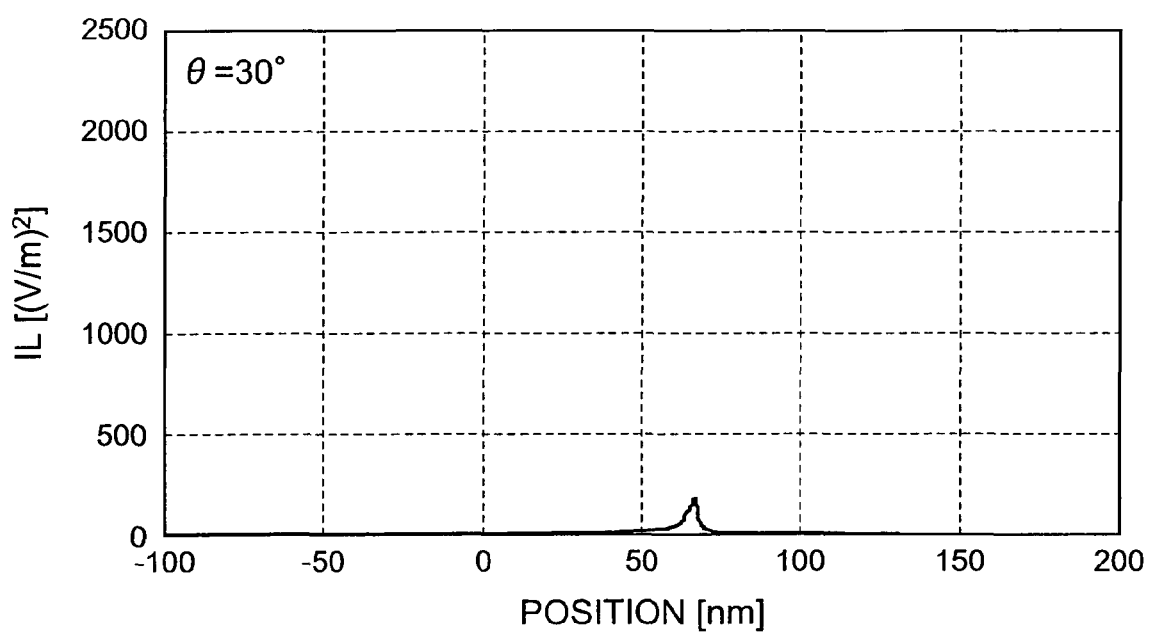
FIG. 13 is a graph illustrating the relationship between position (nm) and IL $(V/m)^2$ when $\theta=30°$.

FIG. 13 is a graph illustrating the relationship between position (nm) and IL $(V/m)^2$ when θ=30° (α=60°). The intensity (density) of the near-field light becomes yet higher. A peak is observed for a single corner. The half width is 15 nm.

Figure 14:
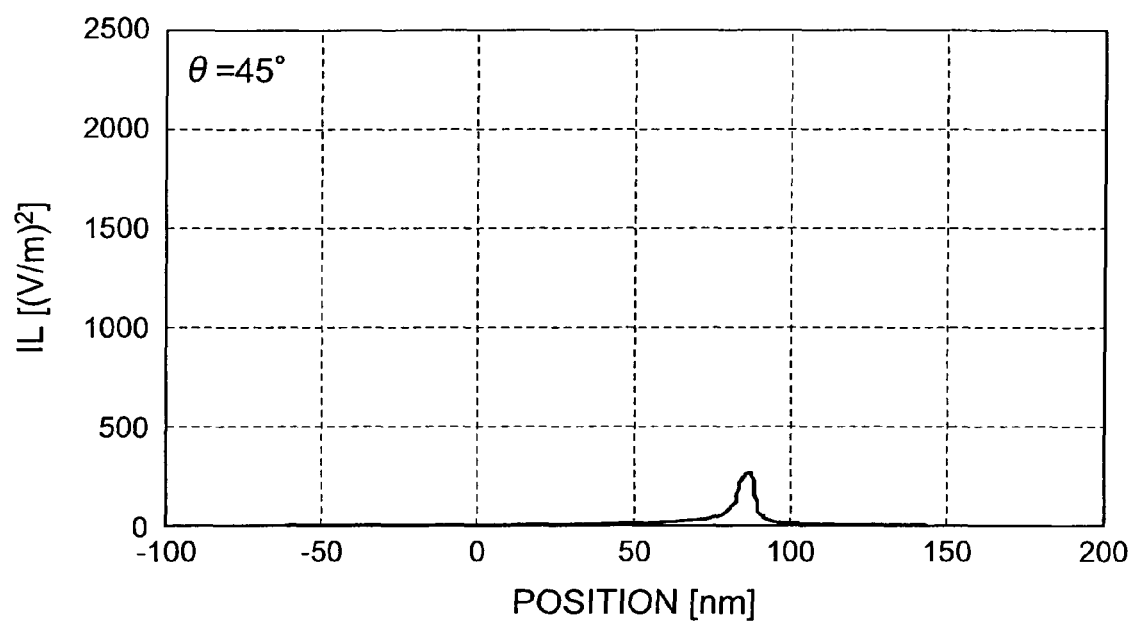
FIG. 14 is a graph illustrating the relationship between position (nm) and IL $(V/m)^2$ when $\theta=45°$.

FIG. 14 is a graph illustrating the relationship between position (nm) and IL $(V/m)^2$ when θ=45° (α=45°). The intensity (density) of the near-field light becomes yet higher. A peak is observed for a single corner.

Figure 15:
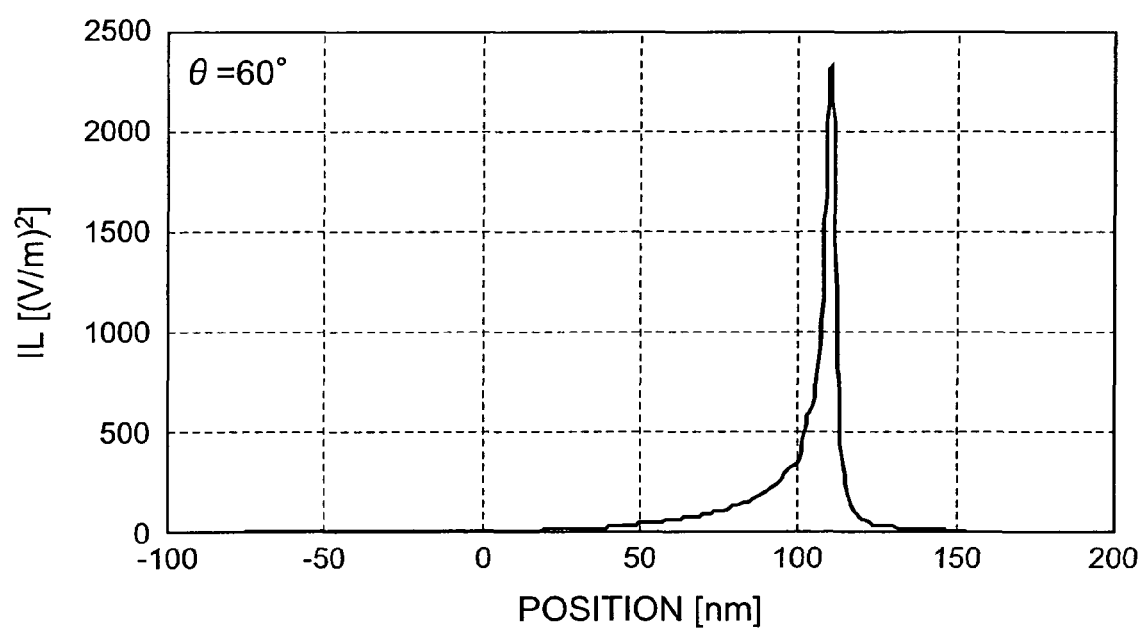
FIG. 15 is a graph illustrating the relationship between position (nm) and IL $(V/m)^2$ when $\theta=60°$.

FIG. 15 is a graph illustrating the relationship between position (nm) and IL $(V/m)^2$ when θ=60° (α=30°). The intensity (density) of the near-field light becomes extremely high. A peak is observed for a single corner.

Figure 16:
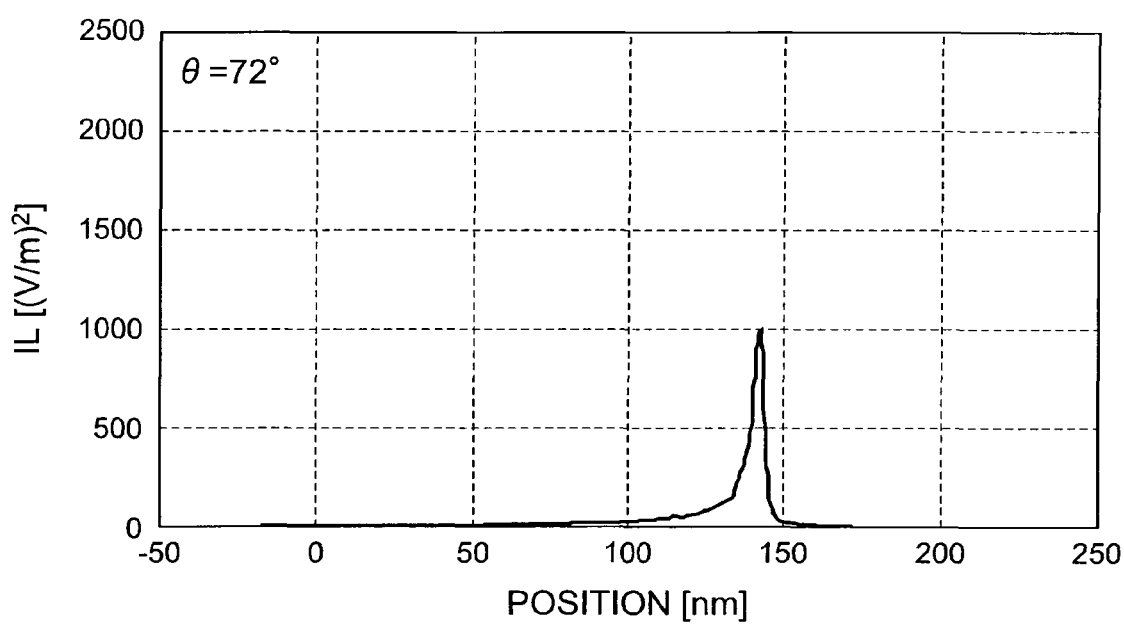
FIG. 16 is a graph illustrating the relationship between position (nm) and IL $(V/m)^2$ when $\theta=72°$.

FIG. 16 is a graph illustrating the relationship between position (nm) and IL $(V/m)^2$ when θ=72° (α=18°). The intensity (density) of the near-field light drops slightly vis-à-vis that for θ=60°. A peak is observed for a single corner.

Figure 17:
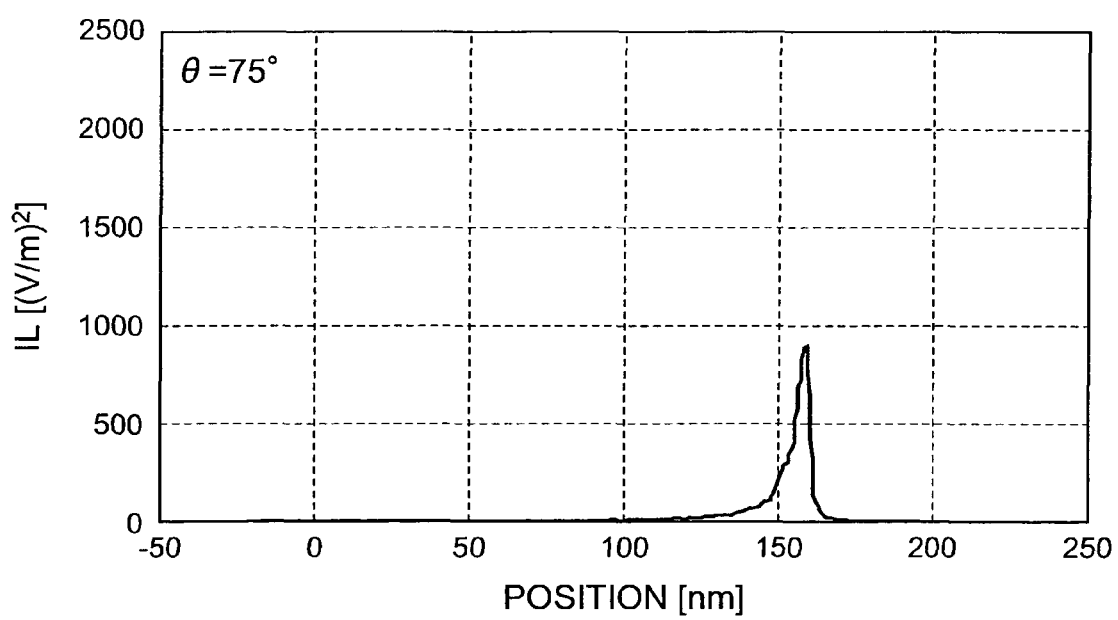
FIG. 17 is a graph illustrating the relationship between position (nm) and IL $(V/m)^2$ when $\theta=75°$.

FIG. 17 is a graph illustrating the relationship between position (nm) and IL $(V/m)^2$ when θ=75° (α=15°). The intensity (density) of the near-field light drops slightly vis-à-vis that for θ=60°. A peak is observed for a single corner.

Figure 18:
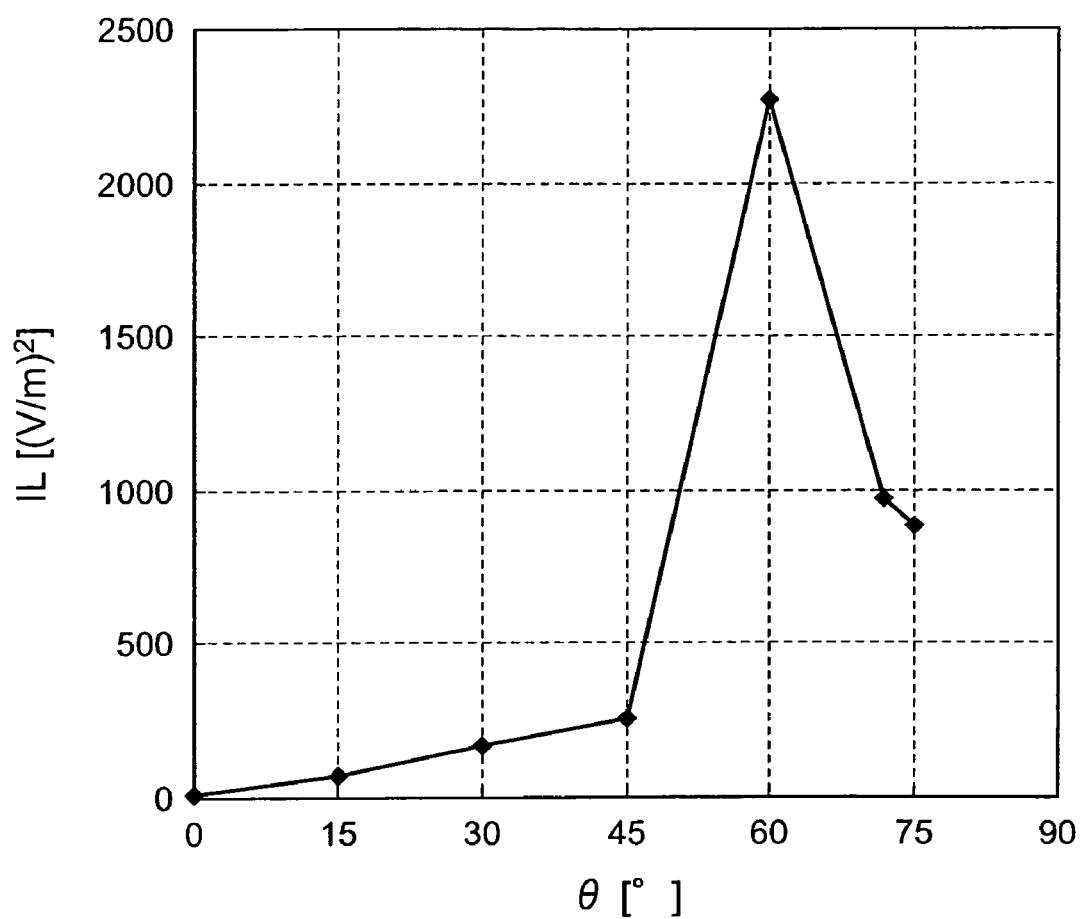
FIG. 18 is a graph illustrating the relationship between $\theta$ (°) and IL $(V/m)^2$.

FIG. 18 is a graph illustrating the relationship between θ (°) and IL (V/m)². FIG. 19 is a table setting forth the relationship between θ (°) and IL (V/m)².

The peak values of the near-field light intensity IL increase abruptly when θ surpasses 45°. Although the intensity drops when θ surpasses 60 degrees, the intensity at θ=75° can be kept still at a value several times that for θ=45°. From the above observations on near-field light intensity, it follows that θ is preferably greater than 45° but no greater than 75°. In other words, α is preferably smaller than 45° but no smaller than 15°.

The near-field intensity distribution generated around the plasmon antenna 8, as viewed from the medium-facing surface S, is additionally explained next with reference to FIGS. 20 to 26. In FIGS. 20 to 26, the quadrangle in the center represents the plasmon antenna 8. The numerical values (arbitrary values) denoting the near-field light intensity illustrated in FIGS. 20 to 26 denote relative values of the intensities in the figures, and do not coincide with the numerical values in FIGS. 11 to 17 above.

Figure 20:
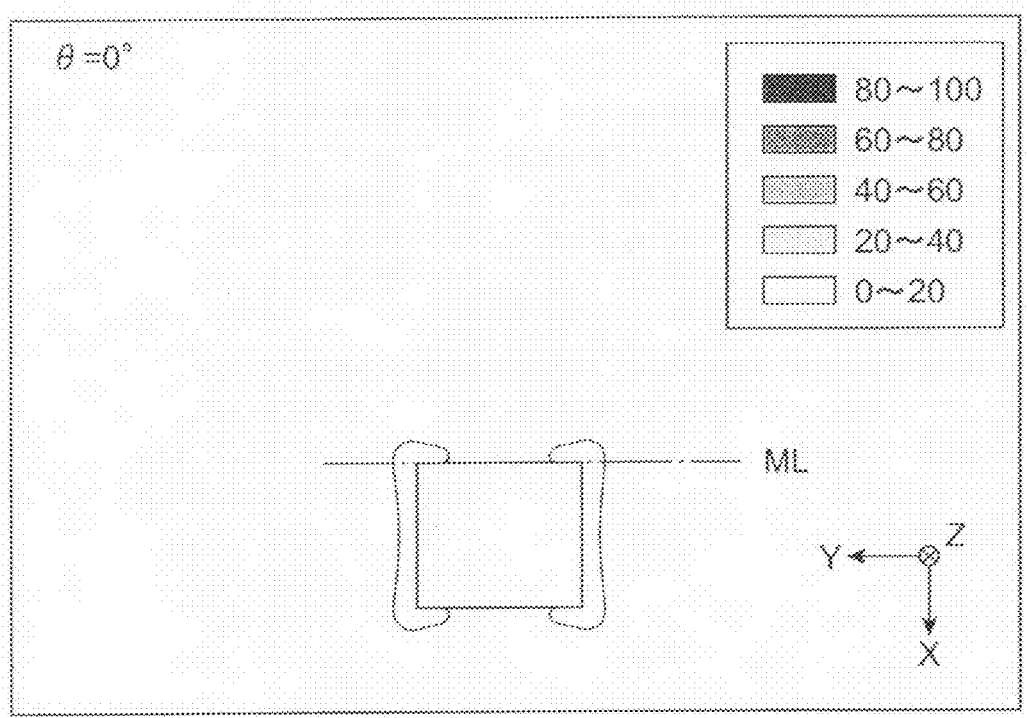
FIG. 20 is a diagram illustrating a near-field intensity distribution around a leading end of a planar plasmon antenna when $\theta=0°$.

FIG. 20 is a diagram illustrating the near-field intensity distribution around the leading end of a planar plasmon antenna when θ=0° (α=90°). The figure shows generation of weak near-field light at two sites along the Y-axis direction.

Figure 21:
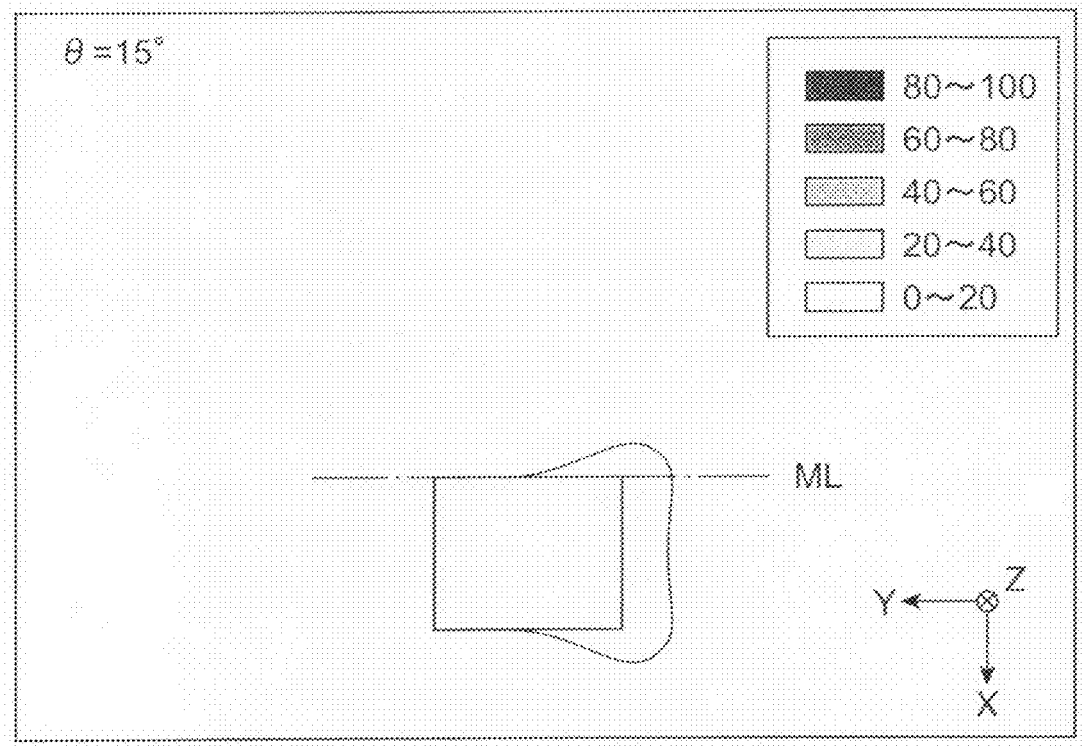
FIG. 21 is a diagram illustrating a near-field intensity distribution around a leading end of a planar plasmon antenna when $\theta=15°$.

FIG. 21 is a diagram illustrating the near-field intensity distribution around the leading end of a planar plasmon antenna when θ=15° (α=75°). The figure shows generation of weak near-field light at one site along the Y-axis direction.

Figure 22:
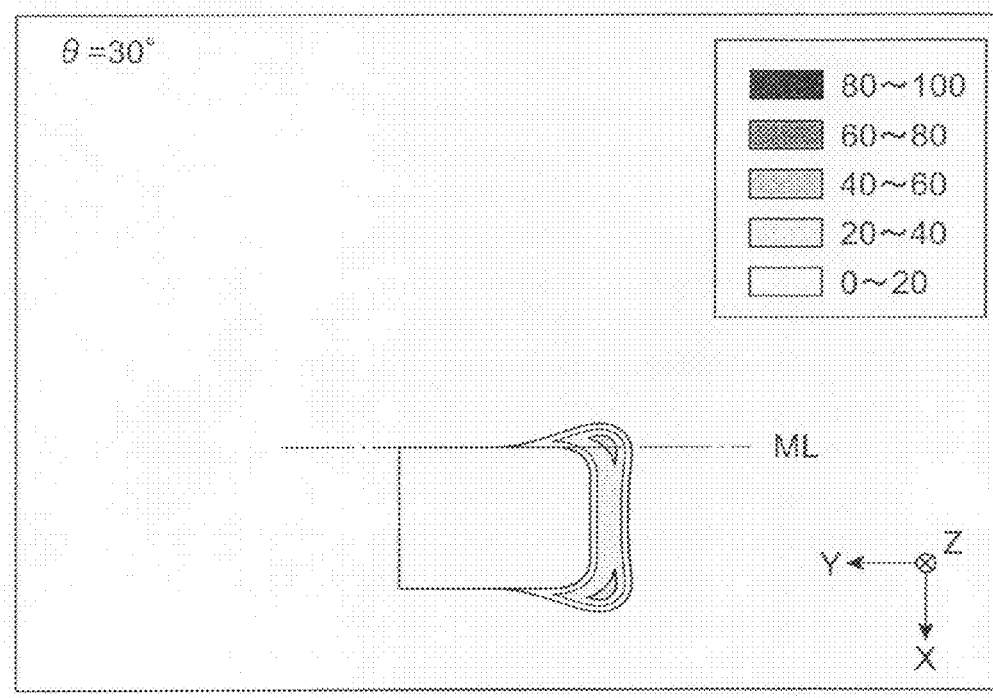
FIG. 22 is a diagram illustrating a near-field intensity distribution around a leading end of a planar plasmon antenna when $\theta=30°$.

FIG. 22 is a diagram illustrating the near-field intensity distribution around the leading end of a planar plasmon antenna when θ=30° (α=60°). The figure shows generation of near-field light at one site along the Y-axis direction, with two peaks being observable on the right end of the plasmon antenna, along the X-axis direction.

Figure 23:
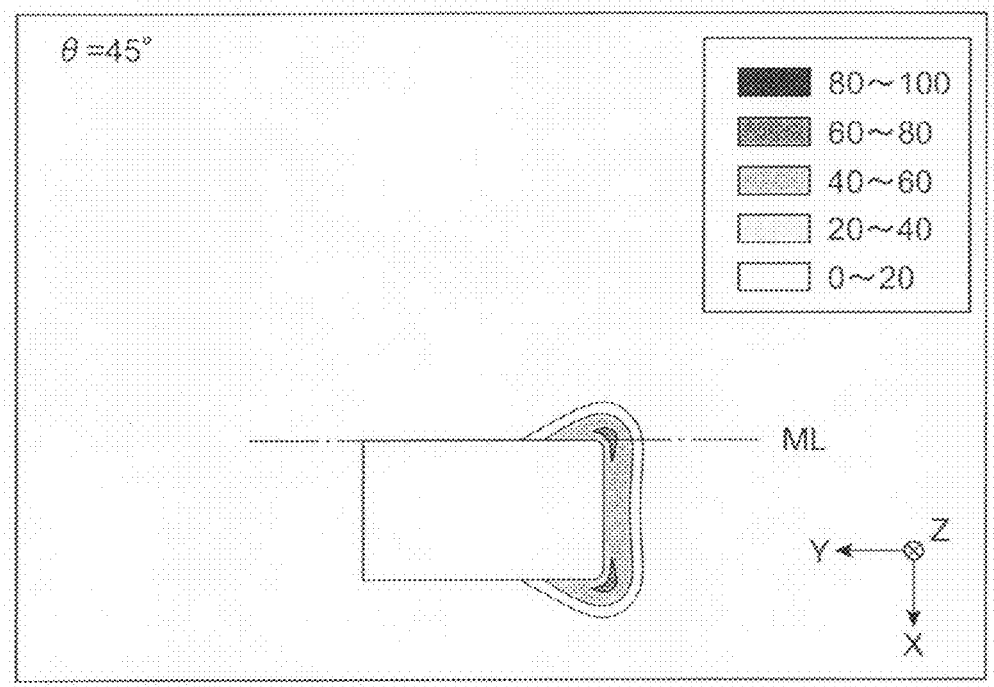
FIG. 23 is a diagram illustrating a near-field intensity distribution around a leading end of a planar plasmon antenna when $\theta=45°$.

FIG. 23 is a diagram illustrating the near-field intensity distribution around the leading end of a planar plasmon antenna when θ=45° (α=45°). The figure shows generation of near-field light at one site along the Y-axis direction, with two peaks being observable on the right end of the plasmon antenna, along the X-axis direction.

Figure 24:
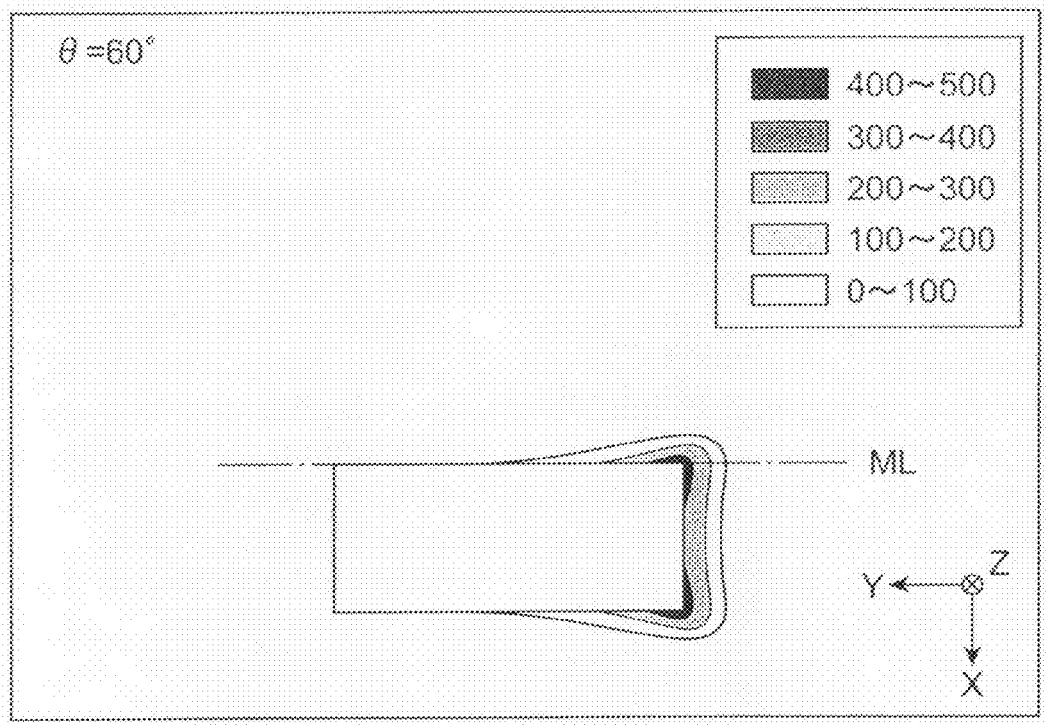
FIG. 24 is a diagram illustrating a near-field intensity distribution around a leading end of a planar plasmon antenna when $\theta=60°$.

FIG. 24 is a diagram illustrating the near-field intensity distribution around the leading end of a planar plasmon antenna when θ=60° (α=30°). The figure shows generation of extremely intense near-field light at one site along the Y-axis direction, with two peaks being observable on the right end of the plasmon antenna, along the X-axis direction.

Figure 25:
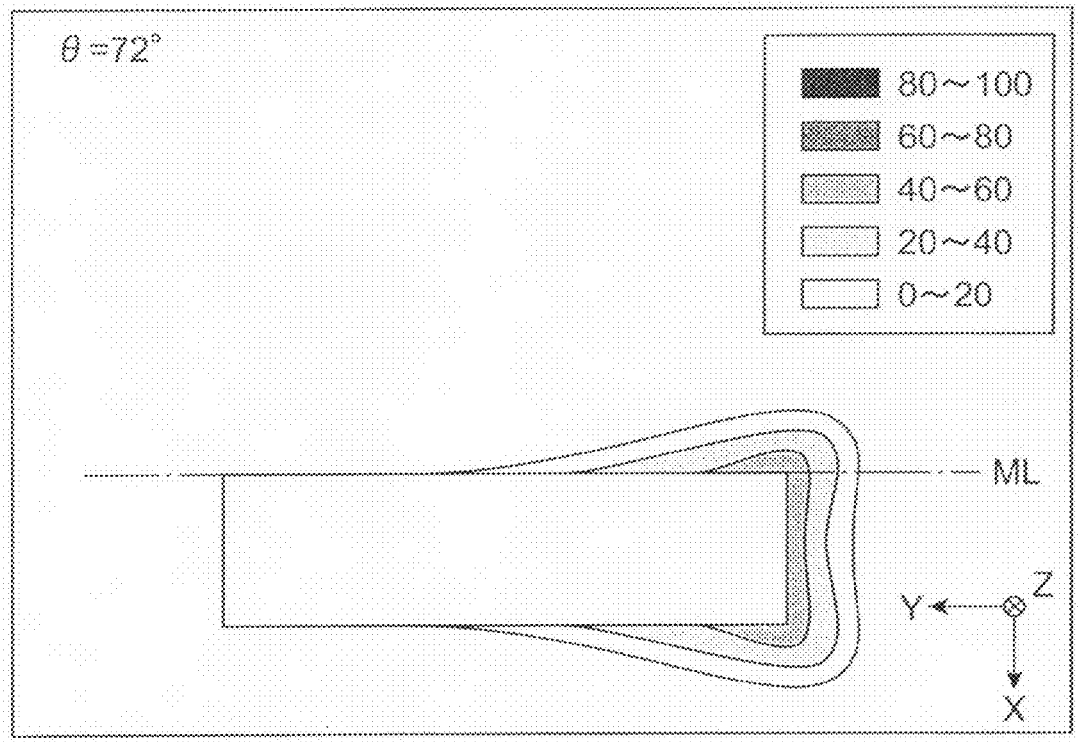
FIG. 25 is a diagram illustrating a near-field intensity distribution around a leading end of a planar plasmon antenna when $\theta=72°$.

FIG. 25 is a diagram illustrating the near-field intensity distribution around the leading end of a planar plasmon antenna when θ=72° (α=18°). The figure shows generation of relatively intense near-field light at one site along the Y-axis direction, with one broad peak being observable on the right end of the plasmon antenna, along the X-axis direction.

Figure 26:
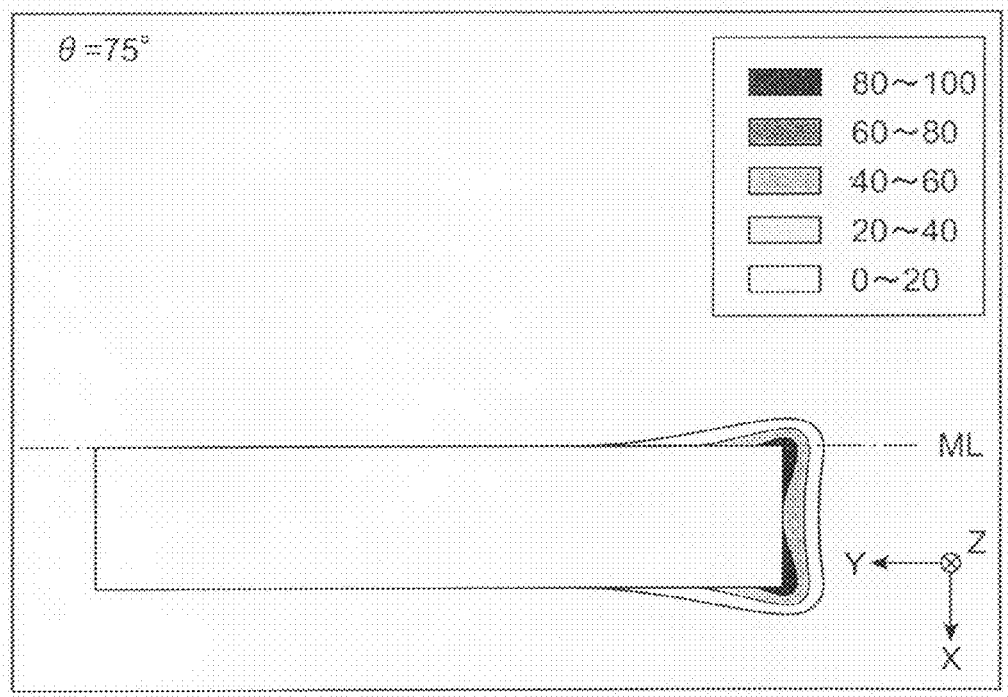
FIG. 26 is a diagram illustrating a near-field intensity distribution around a leading end of a planar plasmon antenna when $\theta=75°$.

FIG. 26 is a diagram illustrating the near-field intensity distribution around the leading end of a planar plasmon antenna when θ=75° (α=15°). The figure shows generation of relatively intense near-field light at one site along the Y-axis direction, with two peaks being observable on the right end of the plasmon antenna, along the X-axis direction.

Figure 27:
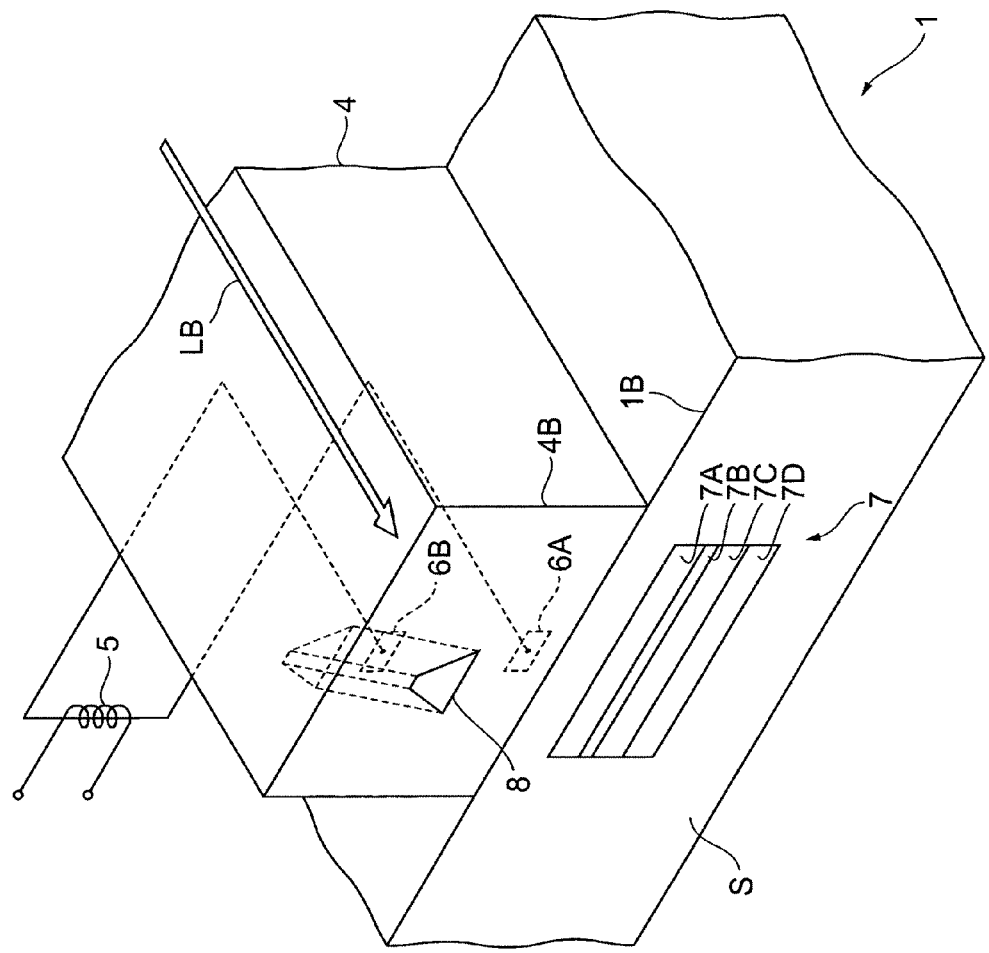
FIG. 27 is a perspective-view diagram of a characterizing portion of a magnetic head.

FIG. 27 is a perspective-view diagram of a characterizing portion of a magnetic head.

The above-described plasmon antenna 8 had a rectangular cross section in the XY plane, but may also have a near-triangular trapezoidal shape, as in FIG. 27. That is, the shape of the plasmon antenna 8 at the medium-facing surface S is a trapezoid whose upper and lower bases are parallel to the Y-axis. The corners of the lower base of the trapezoid are very sharply pointed, and hence high-intensity near-field light is generated at such positions. The corners on the side of the upper base are less pointed, which allows as a result keeping to 1 the number of peaks along the X-axis direction. The shape of the plasmon antenna 8 in the YZ plane is a parallelogram that comprises the lower base of the plasmon antenna 8, which has a trapezoidal front-view shape. The length L1 of the parallelogram (see FIG. 6A) is herein the longitudinal direction of the plasmon antenna 8. The shape in the YZ plane comprising the lower base of the plasmon antenna 8 can also be a trapezoidal shape, as illustrated in FIG. 8A, in which case the length L2 (FIG. 8A) is the longitudinal direction of the plasmon antenna 8.

As explained above, the planar plasmon antenna 8 according to the above embodiment is one only plasmon antenna 8 that is formed, without physical separation, on a plane (YZ plane) comprising a Y-axis and a Z-axis perpendicular to each other, the Z-axis being the propagation direction of excitation light for near-field light generation, wherein the longitudinal direction of the plasmon antenna 8 is oblique relative to the Y-axis or the Z-axis, and an angle α of a corner, in the YZ plane, is an acute angle. The angle α is preferably smaller than 45 degrees but no smaller than 15 degrees. That being the case, the plasmon antenna 8 can generate extremely intense near-field light.

The plasmon antenna 8 comprises at least one metal selected from the group consisting of Au, Ag, Cu and Pt, or an alloy comprising at least one metal from that group. Sufficient near-field light generation is observed, in particular, when the metal is Au. Examples of alloys include, for instance, alloys comprising a metal such as Fe, Ni or the like. The wavelength of the above-described a laser beam may be 833 nm, and the numerical aperture NA thereof may be, for instance, 1.16. As described above, the shape of the planar plasmon antenna 8 is quadrangular when viewed from a direction (X-axis direction) perpendicular to the YZ plane. The shape, however, may be a trapezoidal or parallelogram shape, or a triangular shape. The shape of the tip of the planar plasmon antenna, as viewed from the Z-axis direction, may be rectangular or trapezoidal, with high-intensity near-field light generation being afforded in both cases. The shape of the tip of the planar plasmon antenna, when viewed from the direction (Z-axis direction) perpendicular to the XY plane, i.e. when viewed from the medium-facing surface S, may also be triangular. The effect of the plasmon antenna can be elicited regardless of the size thereof, provided that the dimensions of the plasmon antenna allow for near-field light generation.

The above-described thermally assisted magnetic head comprises a main magnetic pole 6A disposed in the vicinity of a corner that forms an angle α of the plasmon antenna 8; a coil 5 (FIG. 5) for causing magnetic flux to pass through the main magnetic pole 6A; a core 4 through which a laser beam propagates; and a cladding (material of the magnetic head portion 1B) provided around the core 4. The laser beam that propagates through the core 4 allows generating high-intensity near-field light locally, which allows carrying out as a result high-density writing. Instead of a laser beam, light from an extremely intense light-emitting diode may also be used as excitation light.

The above-described plasmon antenna 8 comprises a single small metallic body. Accordingly, the plasmon antenna, which does not constitute a bow-tie aperture, is expected not to give rise to dipole field enhancement. In the absence of such enhancing effect, the magnitude of the peak intensity of the near-field light exceeds a conventional 200-fold at most, which is a non-obvious effect.

What is claimed is:

1. A planar plasmon antenna placed in a thermally assisted magnetic head on a drive arm of a hard disk drive, an X-axis being perpendicular to a track width direction of the hard disk drive, and the track width direction defining a Y-axis, the hard disk drive propagating excitation light for near-field light generation in a light propagation direction defining a Z-axis perpendicular to the X-axis and the Y-axis, the thermally assisted magnetic head having an air bearing surface in an X-Y plane including the X-axis and the Y-axis,
the planar plasmon antenna being one only planar plasmon antenna that is formed, without physical separation, on a Y-Z plane including the Y-axis and the Z-axis,
the planar plasmon antenna having:
a longitudinal direction in which the planar plasmon antenna elongates, the longitudinal direction being oblique relative to the Y-axis,
an angle α between the longitudinal direction and the Y-axis, the angle α being an acute angle, and
a corner having the angle α.

2. The planar plasmon antenna according to claim 1, wherein the angle α is smaller than 45 degrees but not smaller than 15 degrees.

3. The planar plasmon antenna according to claim 1, wherein said plasmon antenna comprises a metal.

4. The planar plasmon antenna according to claim 3, wherein said plasmon antenna comprises at least one metal selected from the group consisting of Au, Ag, Cu and Pt, or an alloy comprising at least one metal from this group.

5. The planar plasmon antenna according to claim 3, wherein said plasmon antenna comprises Au.

6. The planar plasmon antenna according to claim 1, wherein the shape of said planar plasmon antenna, viewed from a direction perpendicular to said Y-Z plane, is a quadrangular shape.

7. The planar plasmon antenna according to claim 6, wherein the shape of said planar plasmon antenna, viewed from a direction perpendicular to said Y-Z plane, is a trapezoidal shape.

8. The planar plasmon antenna according to claim 6, wherein the shape of said planar plasmon antenna, viewed from a direction perpendicular to said Y-Z plane, is a parallelogram shape.

9. The planar plasmon antenna according to claim 1, wherein a tip of said planar plasmon antenna, as viewed from the Z-axis direction, has a rectangular shape.

10. The planar plasmon antenna according to claim 1, wherein a tip of said planar plasmon antenna, as viewed from the Z-axis direction, has a trapezoidal shape.

11. A thermally assisted magnetic head mounted on a drive arm of a hard disk drive, an X-axis being perpendicular to a track width direction of the hard disk drive, and the track width direction defining a Y-axis, the hard disk drive propagating excitation light for near-field light generation in a light propagation direction defining a Z-axis perpendicular to the X-axis and the Y-axis, the thermally assisted magnetic head comprising:
a planar plasmon antenna having an air bearing surface in an X-Y plane including the X-axis and the Y-axis, the planar plasmon antenna being one only planar plasmon antenna that is formed, without physical separation, on a Y-Z plane including the Y-axis and the Z-axis, the planar plasmon antenna having:
a longitudinal direction in which the planar plasmon antenna elongates, the longitudinal direction being oblique relative to the Y-axis;
an angle α between the longitudinal direction and the Y-axis, the angle α being an acute angle; and
a corner having the angle α;
a main magnetic pole disposed in a vicinity of said corner of the planar plasmon antenna;
a coil for causing magnetic flux to pass through said main magnetic pole; and
a core through which said excitation light propagates.

12. The thermally assisted magnetic head according to claim 11, further comprising a magnetoresistive element disposed on an extension line along a thickness direction of said planar plasmon antenna.

13. A hard disk drive, comprising:
a head gimbal assembly having a drive arm, an X-axis being perpendicular to a track width direction of the hard disk drive, and the track width direction defining a Y-axis, the hard disk drive propagating excitation light for near-field light generation in a light propagation direction defining a Z-axis perpendicular to the X-axis and the Y-axis;
a thermally assisted magnetic head mounted on the drive arm; and
a magnetic recording medium opposing said thermally assisted magnetic head,
wherein the thermally assisted magnetic head comprises:
a planar plasmon antenna having an air bearing surface in an X-Y plane including the X-axis and the Y-axis, the planar plasmon antenna being one only planar plasmon antenna that is formed, without physical separation, on a Y-Z plane including the Y-axis and the Z-axis, the planar plasmon antenna having:
a longitudinal direction in which the planar plasmon antenna elongates, the longitudinal direction being oblique relative to the Y-axis,
an angle α between the longitudinal direction and the Y-axis, the angle α being an acute angle; and
a corner having the angle α;
a main magnetic pole disposed in a vicinity of said corner of the planar plasmon antenna;
a coil for causing magnetic flux to pass through said main magnetic pole; and
a core through which said excitation light propagates.

14. The planar plasmon antenna according to claim 1, wherein a cross section of said planar plasmon antenna in a plane that is parallel to the X-Y plane has a trapezoidal shape.

* * * * *